United States Patent
Yamanaka

(10) Patent No.: US 9,857,574 B2
(45) Date of Patent: Jan. 2, 2018

(54) ZOOM LENS SYSTEM AND IMAGING APPARATUS

(71) Applicant: Panasonic Intellectual Property Management Co., Ltd., Osaka (JP)

(72) Inventor: Takao Yamanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/371,048

(22) Filed: Dec. 6, 2016

(65) Prior Publication Data

US 2017/0176728 A1 Jun. 22, 2017

(30) Foreign Application Priority Data

Dec. 22, 2015 (JP) .................................. 2015-250150
Nov. 2, 2016 (JP) .................................. 2016-214894

(51) Int. Cl.

| G02B 15/14 | (2006.01) |
| G02B 15/173 | (2006.01) |
| G02B 5/00 | (2006.01) |
| G02B 27/64 | (2006.01) |
| G02B 27/00 | (2006.01) |
| G02B 13/18 | (2006.01) |

(52) U.S. Cl.
CPC ........... *G02B 15/173* (2013.01); *G02B 5/005* (2013.01); *G02B 13/18* (2013.01); *G02B 27/0025* (2013.01); *G02B 27/646* (2013.01)

(58) Field of Classification Search
CPC .... G02B 15/173; G02B 15/177; G02B 15/17; G02B 15/14; G02B 15/163

USPC ................................. 359/676, 680–682, 684
See application file for complete search history.

(56) References Cited

U.S. PATENT DOCUMENTS

2009/0290232 A1* 11/2009 Hagiwara ............ G02B 15/173
359/695
2014/0268365 A1 9/2014 Nishio et al.
2014/0354857 A1 12/2014 Kato et al.

FOREIGN PATENT DOCUMENTS

JP 2014-178478 9/2014
JP 2014-235238 12/2014

* cited by examiner

*Primary Examiner* — James Greece
(74) *Attorney, Agent, or Firm* — Wenderoth, Lind & Ponack, L.L.P.

(57) ABSTRACT

A zoom lens system, in order from an object side to an image side, includes: a first lens group having positive optical power; a second lens group having negative optical power; a third lens group having positive optical power; a fourth lens group having negative optical power; and a fifth lens group having positive optical power, wherein focusing is performed by moving the fourth lens group, and conditions (1) through (3) are satisfied:

$$\Sigma d/(fT \times \tan \omega T) < 3.5 \qquad (1)$$

$$LT/fT < 1.1 \qquad (2)$$

$$9.1 < fT/fW \qquad (3)$$

where
$\Sigma d$ is a total thickness of each of the lens groups,
$\omega T$ is a half angle of view at the telephoto end,
$fW$ is a focal length at the wide angle end,
$fT$ is a focal length at the telephoto end, and
$LT$ is an optical total length at the telephoto end.

11 Claims, 10 Drawing Sheets

ZOOM LENS SYSTEM AND IMAGING APPARATUS

BACKGROUND

1. Technical Field

The present disclosure relates to a small zoom lens system having a zoom ratio of about 10 and a high resolution from infinity to a close range and an imaging apparatus using the zoom lens system. The present disclosure also relates to a camera including the imaging apparatus.

2. Description of the Related Art

Cameras including imaging elements for photoelectric conversion, such as digital still cameras and digital video cameras, have been highly demanded to have high zoom ratios and small size, and especially recent compact cameras integrated with imaging elements have been demanded to have enhanced image quality by increasing the size of the imaging elements. For example, one of various types of zoom lens systems proposed to date has a five-group configuration including positive, negative, positive, negative, and positive lens groups, specifically, a first lens group having positive optical power, a second lens group having negative optical power, a third lens group having positive optical power, a fourth lens group having negative optical power, and a fifth lens group having positive optical power, in order from an object side to an image side.

Japanese Patent Unexamined Publications Nos. 2014-178478 and 2014-235238 disclose zoom lens systems each used in a five-group configuration including positive, negative, positive, negative, and positive lens groups for obtaining a high zoom ratio to perform zooming by changing the distance between the groups.

SUMMARY

The present disclosure has an object of providing a small zoom lens system having a zoom ratio of about 10 and a high resolution from infinity to a close range, an imaging apparatus using the zoom lens system, and a camera including the imaging apparatus.

A zoom lens system according to an aspect of the present disclosure, in order from an object side to an image side, includes: a first lens group having positive optical power; a second lens group having negative optical power; a third lens group having positive optical power; a fourth lens group having negative optical power; and a fifth lens group having positive optical power, wherein each of the lens groups moves during zooming from a wide angle end to a telephoto end, focusing is performed by moving the fourth lens group on an optical axis, and conditions (1) through (3) are satisfied:

$$\Sigma d/fT \times \tan \omega T < 3.5 \quad (1)$$

$$LT/fT < 1.1 \quad (2)$$

$$9.1 < fT/fW \quad (3)$$

where $\Sigma d$ is a total thickness of each of the lens groups on the optical axis, $\omega T$ is a half angle of view at the telephoto end, $fW$ is a focal length at the wide angle end, $fT$ is a focal length at the telephoto end, and $LT$ is an optical total length at the telephoto end.

According to the present disclosure, it is possible to provide a small zoom lens system having a zoom ratio of about 10 and a high resolution from infinity to a close range, an imaging apparatus using the zoom lens system, and a camera including the imaging apparatus.

DETAILED DESCRIPTION OF PREFERRED EMBODIMENTS

First Through Third Exemplary Embodiments

Figure 1:
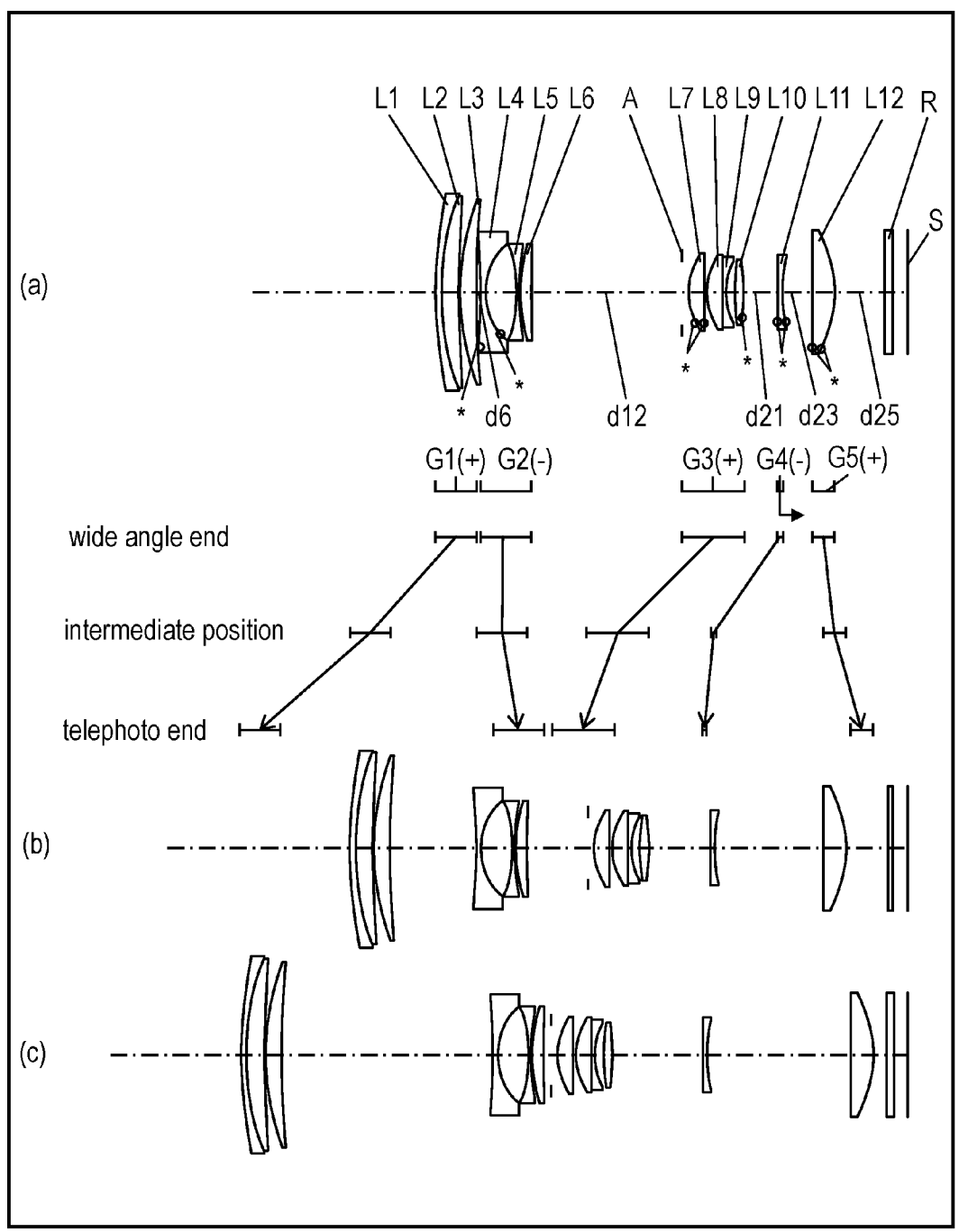
FIG. 1 illustrates a lens layout in an infinity focusing state of a zoom lens system according to a first exemplary embodiment (first working example).
Figure 4:
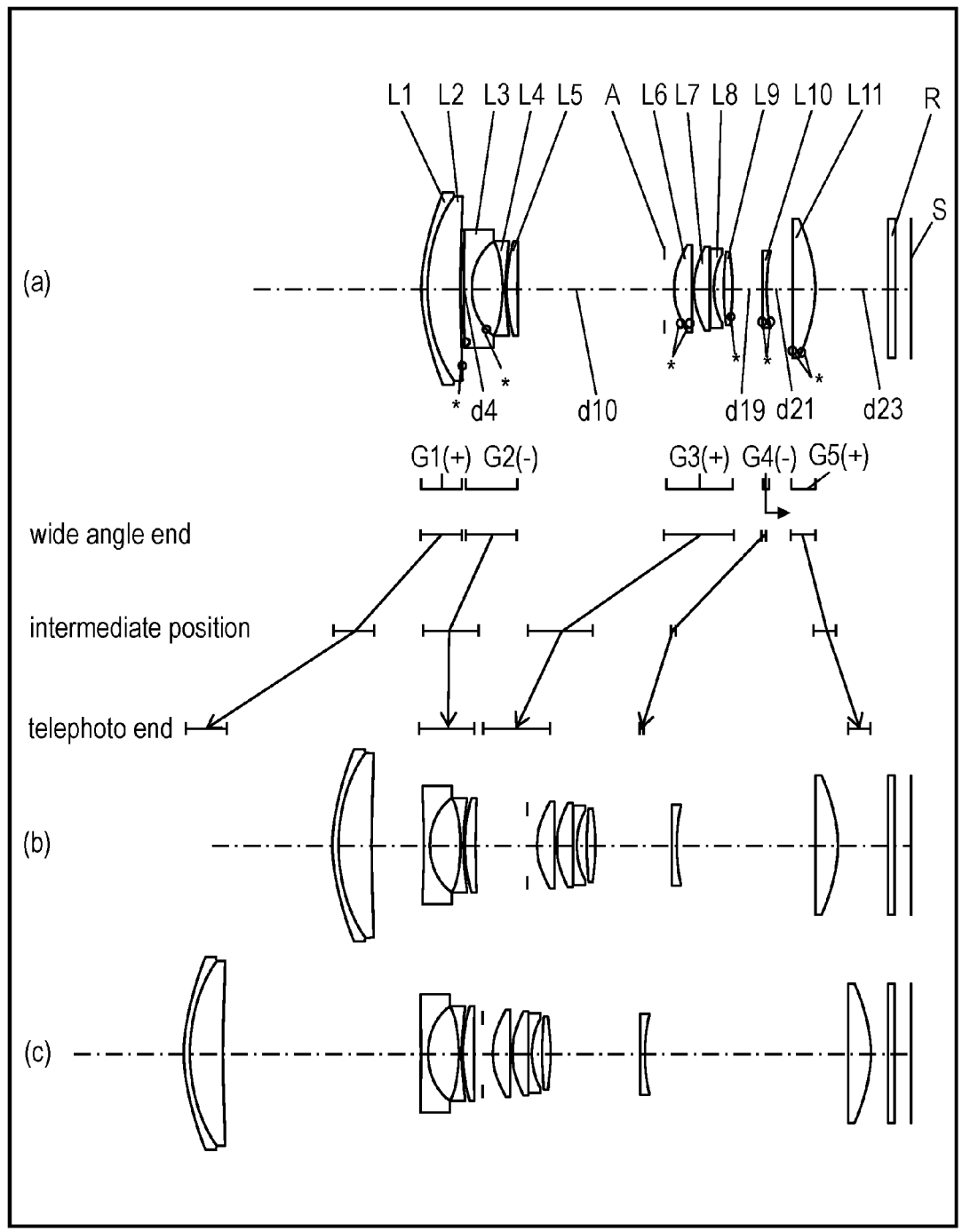
FIG. 4 illustrates a lens layout in an infinity focusing state of a zoom lens system according to a second exemplary embodiment (second working example).
Figure 7:
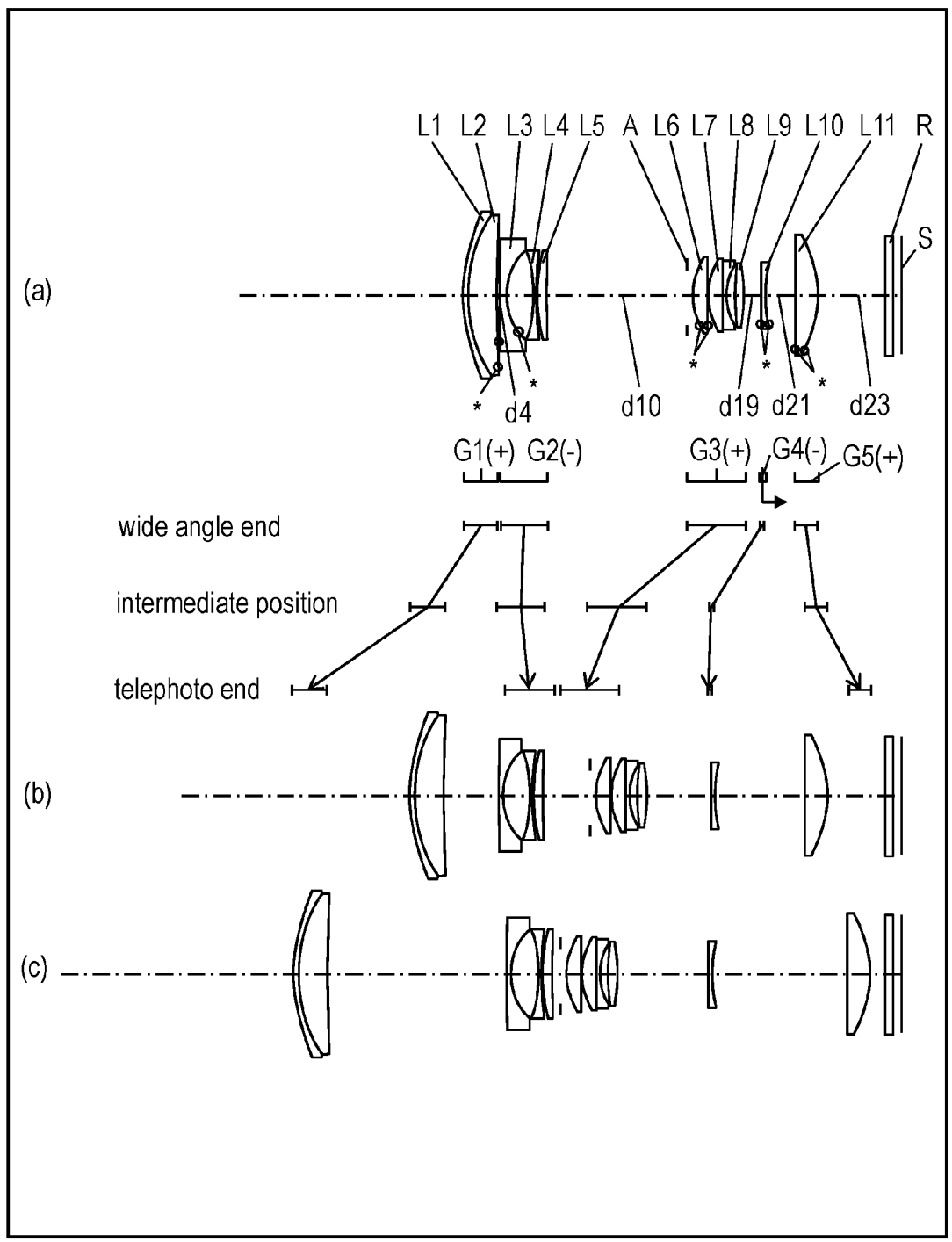
FIG. 7 illustrates a lens layout in an infinity focusing state of a zoom lens system according to a third exemplary embodiment (third working example).

FIGS. 1, 4, and 7 illustrate lens layouts of zoom lens systems according to first through third exemplary embodiments each of which is in infinity focusing state.

In FIGS. 1, 4, and 7, (a) illustrates a lens configuration at a wide angle end (minimum focal length state: focal length fW), (b) illustrates a lens configuration at an intermediate position (intermediate focal length state: focal length $fM=\sqrt{(fW*fT)}$), and (c) illustrates a lens configuration at a telephoto end (maximum focal length state: focal length fT). In FIGS. 1, 4, and 7, line arrows between (a) and (b) are lines each connecting positions of the corresponding lens group at the wide angle end, the intermediate position, and the telephoto end in this order from the top. The wide angle end and the intermediate position are simply connected by lines, and the intermediate position and the telephoto end are also simply connected by lines. Thus, movements indicated by these lines differ from actual movements of the lens groups.

In addition, in each of FIGS. 1, 4, and 7, an arrow provided to the lens group represent focusing from the infinity focusing state to a close focusing state. More specifically, in each of FIGS. 1, 4, and 7, the arrow represents the direction in which fourth lens group G4 described later moves during focusing from the infinity focusing state to the close focusing state. In each of FIGS. 1, 4, and 7, reference characters of lens groups are provided under the corresponding lens groups, and the arrow representing focusing is provided under the reference characters of the lens groups for convenience. The direction of movement of each lens group during focusing in the zooming state will be specifically described later in exemplary embodiments.

In FIGS. 1, 4, and 7, asterisks * provided to specific surfaces indicate that the surfaces with asterisks are aspheric surfaces. In FIGS. 1, 4, and 7, symbols (+) and (−) provided to the reference characters of the lens groups correspond to the signs of optical power of the lens groups. In each of FIGS. 1, 4, and 7, the line at the right represents the position of image plane S (a surface of an imaging element at an object side).

First Exemplary Embodiment

FIG. 1 illustrates a zoom lens system according to a first exemplary embodiment. The zoom lens system, in order from an object side to an image side, includes first lens group G1 having positive optical power, second lens group G2 having negative optical power, third lens group G3 having positive optical power, fourth lens group G4 having negative optical power, fifth lens group G5 having positive optical power, and plane-parallel plate R.

First lens group G1, in order from the object side to the image side, includes first lens element L1 having negative optical power, second lens element L2 having positive optical power, and third lens element L3 having positive optical power. First lens element L1 and second lens element L2 are cemented lenses bonded by, for example, an adhesive.

Second lens group G2, in order from the object side to the image side, includes fourth lens element L4 having negative optical power, fifth lens element L5 having negative optical power, and sixth lens element L6 having positive optical power.

Third lens group G3, in order from the object side to the image side, includes aperture stop A, seventh lens element L7 having positive optical power, eighth lens element L8 having positive optical power, ninth lens element L9 having negative optical power, and tenth lens element L10 having positive optical power. Eighth lens element L8 and ninth lens element L9 are cemented lenses bonded by, for example, an adhesive.

Fourth lens group G4 is a single lens and is constituted by eleventh lens element L11 having negative optical power.

Fifth lens group G5 is a single lens and is constituted by twelfth lens element L12 having positive optical power.

The lens elements will now be described.

The lens elements in first lens group G1 will be described. First lens element L1 is a meniscus lens having a convex surface at the object side. Second lens element L2 is a meniscus lens having a convex surface at the object side. Third lens element L3 is a meniscus lens having a convex surface at the object side.

The lens elements in second lens group G2 will be described. Fourth lens element L4 is a meniscus lens having a convex surface at the object side, and has aspheric surfaces at the object side and the image side. Fifth lens element L5 is a double-concave lens. Sixth lens element L6 is a double-convex lens.

The lens elements in third lens group G3 will be described. Seventh lens element L7 is a meniscus lens having a convex surface at the object side, and has aspheric surfaces at the object side and the image side. Eighth lens element L8 is a meniscus lens having a convex surface at the object side. Ninth lens element L9 is a meniscus lens having a convex surface at the object side. Tenth lens element L10 is a double-convex lens and has an aspheric surface at the image side.

The lens element in fourth lens group G4 will be described. Eleventh lens element L11 is a meniscus lens having a convex surface at the object side, and has aspheric surfaces at the object side and the image side.

The lens element in fifth lens group G5 will be described. Twelfth lens element L12 is a double-convex lens and has aspheric surfaces at the object side and the image side.

In the zoom lens system according to the first exemplary embodiment, during zooming from a wide angle end to a telephoto end in imaging, first lens group G1, third lens group G3, and fourth lens group G4 move to the object side, second lens group G2 moves to the object side while forming a convex trajectory, and fifth lens group G5 moves to the image side. That is, during zooming, the lens groups move along an optical axis in such a manner that a distance between first lens group G1 and second lens group G2 increases, a distance between second lens group G2 and third lens group G3 decreases, a distance between third lens group G3 and fourth lens group G4 increases, and a distance between fourth lens group G4 and fifth lens group G5 increases.

In the zoom lens system according to the first exemplary embodiment, during focusing from the infinity focusing state to the close focusing state, fourth lens group G4 moves to the image side along the optical axis.

All the lens elements (lens elements for image shake correction) in third lens group G3 move perpendicularly to the optical axis in order to optically correct shake of an image. These image shake correcting lens elements enable the zoom lens system to correct a shift of an image point caused by vibrations of the entire system. That is, the zoom lens system can optically correct image shake caused by hand shake and/or vibrations, for example.

Second Exemplary Embodiment

FIG. 4 illustrates a zoom lens system according to a second exemplary embodiment. The zoom lens system, in order from an object side to an image side, includes first lens group G1 having positive optical power, second lens group G2 having negative optical power, third lens group G3 having positive optical power, fourth lens group G4 having negative optical power, fifth lens group G5 having positive optical power, and plane-parallel plate R.

First lens group G1, in order from the object side to the image side, includes first lens element L1 having negative optical power and second lens element L2 having positive optical power. First lens element L1 and second lens element L2 are cemented lenses bonded by, for example, an adhesive.

Second lens group G2, in order from the object side to the image side, includes third lens element L3 having negative optical power, fourth lens element L4 having negative optical power, and fifth lens element L5 having positive optical power.

Third lens group G3, in order from the object side to the image side, includes aperture stop A, sixth lens element L6 having positive optical power, seventh lens element L7 having positive optical power, eighth lens element L8 having negative optical power, and ninth lens element L9 having positive optical power. Seventh lens element L7 and eighth lens element L8 are cemented lenses bonded by, for example, an adhesive.

Fourth lens group G4 is a single lens and is constituted by tenth lens element L10 having negative optical power.

Fifth lens group G5 is a single lens and is constituted by eleventh lens element L11 having positive optical power.

The lens elements will now be described.

The lens elements in first lens group G1 will be described. First lens element L1 is a meniscus lens having a convex surface at the object side. Second lens element L2 is a double-convex lens and has an aspheric surface at the image side.

The lens elements in second lens group G2 will be described. Third lens element L3 is a meniscus lens having a convex surface at the object side, and has aspheric surfaces at the object side and the image side. Fourth lens element L4 is a double-concave lens. Fifth lens element L5 is a double-convex lens.

The lens elements in third lens group G3 will be described. Sixth lens element L6 is a double-convex lens and has aspheric surfaces at the object side and the image side. Seventh lens element L7 is a meniscus lens having a convex surface at the object side. Eighth lens element L8 is a meniscus lens having a convex surface at the object side. Ninth lens element L9 is a double-convex lens and has an aspheric surface at the image side.

The lens element in fourth lens group G4 will be described. Tenth lens element L10 is a double-concave lens and has aspheric surfaces at the object side and the image side.

The lens element in fifth lens group G5 will be described. Eleventh lens element L11 is a double-convex lens and has aspheric surfaces at the object side and the image side.

In the zoom lens system according to the second exemplary embodiment, during zooming from a wide angle end to a telephoto end in imaging, first lens group G1, second lens group G2, third lens group G3, and fourth lens group G4 move to the object side, and fifth lens group G5 moves to the image side. That is, during zooming, the lens groups move along an optical axis in such a manner that a distance between first lens group G1 and second lens group G2 increases, a distance between second lens group G2 and third lens group G3 decreases, a distance between third lens group G3 and fourth lens group G4 increases, and a distance between fourth lens group G4 and fifth lens group G5 increases.

In the zoom lens system according to the second exemplary embodiment, during focusing from the infinity focusing state to the close focusing state, fourth lens group G4 moves to the image side along the optical axis.

All the lens elements (lens elements for image shake correction) in third lens group G3 move perpendicularly to the optical axis in order to optically correct shake of an image. These image shake correcting lens elements enable the zoom lens system to correct a shift of an image point caused by vibrations of the entire system. That is, the zoom lens system can optically correct image shake caused by hand shake and/or vibrations, for example.

Third Exemplary Embodiment

FIG. 7 illustrates a zoom lens system according to a third exemplary embodiment. The zoom lens system, in order from an object side to an image side, includes first lens group G1 having positive optical power, second lens group G2 having negative optical power, third lens group G3 having positive optical power, fourth lens group G4 having negative optical power, fifth lens group G5 having positive optical power, and plane-parallel plate R.

First lens group G1, in order from the object side to the image side, includes first lens element L1 having negative optical power and second lens element L2 having positive optical power. First lens element L1 and second lens element L2 are cemented lenses bonded by, for example, an adhesive.

Second lens group G2, in order from the object side to the image side, includes third lens element L3 having negative optical power, fourth lens element L4 having negative optical power, and fifth lens element L5 having positive optical power.

Third lens group G3, in order from the object side to the image side, includes aperture stop A, sixth lens element L6 having positive optical power, seventh lens element L7 having positive optical power, eighth lens element L8 having negative optical power, and ninth lens element L9 having positive optical power. Seventh lens element L7 and eighth lens element L8 are cemented lenses bonded by, for example, an adhesive.

Fourth lens group G4 is a single lens and is constituted by tenth lens element L10 having negative optical power.

Fifth lens group G5 is a single lens and is constituted by eleventh lens element L11 having positive optical power.

The lens elements will now be described.

The lens elements in first lens group G1 will be described. First lens element L1 is a meniscus lens having a convex surface at the object side. Second lens element L2 is a double-convex lens and has an aspheric surface at the image side.

The lens elements in second lens group G2 will be described. Third lens element L3 is a meniscus lens having a convex surface at the object side, and has aspheric surfaces at the object side and the image side. Fourth lens element L4 is a double-concave lens. Fifth lens element L5 is a double-convex lens.

The lens elements in third lens group G3 will be described. Sixth lens element L6 is a meniscus lens having a convex surface at the object side, and has aspheric surfaces at the object side and the image side. Seventh lens element L7 is a meniscus lens having a convex surface at the object side. Eighth lens element L8 is a meniscus lens having a convex surface at the object side. Ninth lens element L9 is a double-convex lens.

The lens element in fourth lens group G4 will be described. Tenth lens element L10 is a meniscus lens having a convex surface at the object side, and has aspheric surfaces at the object side and the image side.

The lens element in fifth lens group G5 will be described. Eleventh lens element L11 is a double-convex lens and has aspheric surfaces at the object side and the image side.

In the zoom lens system according to the third exemplary embodiment, during zooming from a wide angle end to a telephoto end in imaging, first lens group G1, third lens group G3, and fourth lens group G4 move to the object side, second lens group G2 moves to the object side while forming a convex trajectory, and fifth lens group G5 moves to the image side. That is, during zooming, the lens groups move along an optical axis in such a manner that a distance between first lens group G1 and second lens group G2 increases, a distance between second lens group G2 and third lens group G3 decreases, a distance between third lens group G3 and fourth lens group G4 increases, and a distance between fourth lens group G4 and fifth lens group G5 increases.

In the zoom lens system according to the third exemplary embodiment, during focusing from the infinity focusing state to the close focusing state, fourth lens group G4 moves to the image side along the optical axis.

All the lens elements (lens elements for image shake correction) in third lens group G3 move perpendicularly to the optical axis in order to optically correct shake of an image. These image shake correcting lens elements enable the zoom lens system to correct a shift of an image point caused by vibrations of the entire system. That is, the zoom lens system can optically correct image shake caused by hand shake and/or vibrations, for example.

Other Exemplary Embodiments

As described above, the first through third exemplary embodiments have been described as examples of a technique disclosed in this application. However, the technique disclosed here is not limited to these examples, and is applicable to other exemplary embodiments obtained by performing changes, replacement, addition, and/or omission as necessary.

The number of lens groups and the number of lens elements in each lens group are substantial numbers, and lenses having substantially no optical power may be added.

In the above exemplary embodiments, all the lens elements in third lens group G3 are image shake correcting lens elements to constitute an image shake correcting lens group, but the image shake correcting lens group may be constituted by one or more of the lens elements in third lens group G3.

In the above exemplary embodiments, the image shake correcting lens elements move perpendicularly to the optical axis to perform image shake correction. Image shake can also be corrected as long as the image shake correcting lens elements move while having perpendicular components. For example, if complication of the barrel configuration is permitted, image shake correction may be performed by rotating the image shake correcting lens elements about the optical axis.

As an example in which third lens group G3 includes the stop, the stop is disposed at the side closest to the object in the third lens group in the above exemplary embodiments. Alternatively, the stop may be disposed at the side closest to an image in the third lens group. The stop may be disposed between any two of the lens elements in the third lens group. The stop only needs to be at a position at which the stop moves integrally with the third lens group during zooming.

Conditions, Advantages, Etc.

Conditions that can be satisfied by the zoom lens systems according to the first through third exemplary embodiments will now be described. Although possible conditions are defined for the zoom lens systems according the first through third exemplary embodiments, a configuration of the zoom lens systems satisfying all these conditions are most advantageous. However, it is possible to obtain a zoom lens system having one or more corresponding advantages by satisfying individual conditions.

Each of the zoom lens systems according to the first through third exemplary embodiments, in order from an object side to an image side, includes: a first lens group having positive optical power; a second lens group having negative optical power; a third lens group having positive optical power; a fourth lens group having negative optical power; and a fifth lens group having positive optical power, wherein each of the lens groups moves during zooming from a wide angle end to a telephoto end, focusing is performed by moving the fourth lens group on an optical axis, and conditions (1) through (3) are satisfied:

$$\Sigma d/fT \times \tan \omega T) < 3.5 \quad (1)$$

$$LT/fT < 1.1 \quad (2)$$

$$9.1 < fT/fW \quad (3)$$

where Σd is a total thickness of each of the lens groups on the optical axis,
ωT is a half angle of view at the telephoto end,
fW is a focal length at the wide angle end,
fT is a focal length at the telephoto end, and
LT is an optical total length at the telephoto end.

Specific numerical values of thicknesses of the lens groups on the optical axis correspond to lens configuration lengths shown in Tables 3C, 6C, and 9C of first through third numerical working examples described later. Specific numerical values of half angles of view at the telephoto end, focal lengths at the wide angle end, focal lengths at the telephoto end, and optical total lengths at the telephoto end are shown in Tables 3A, 6A, and 9A of the first through third numerical working examples described later.

Condition (1) is a condition for defining a ratio of the total thickness of each lens group on the optical axis to a focal length and a half angle of view at the telephoto end. If the ratio exceeds the upper limit of condition (1), the total thickness of the lens group on the optical axis relative to an image height calculated from the focal length and the half angle of view at the telephoto end excessively increases, resulting in difficulty in providing a compact lens barrel and a compact imaging apparatus. Conditions (2) is a condition for defining a ratio of an optical total length to a focal length at the telephoto end. If the ratio exceeds the upper limit of condition (2), the optical total length relative to the focal length at the telephoto end excessively increases, resulting in difficulty in providing a compact lens barrel and a compact imaging apparatus. If the ratio is below the lower limit of condition (3), the zoom ratio decreases so that a high-magnification zoom lens system cannot be provided.

More preferably, the advantages described above can be enhanced by satisfying condition (1)':

$$\Sigma d/(fT \times \tan \omega T) < 3.2 \quad (1)'$$

It is also preferable to satisfy condition (4):

$$-3.0 < fT/fG4 < -2.7 \quad (4)$$

where
fT is a focal length at the telephoto end, and
fG4 is a focal length of the fourth lens group.

Specific numerical values of the focal length of the fourth lens group are shown in Tables 3C, 6C, and 9C of the first through third numerical working examples described later.

Condition (4) is a condition for defining a focal length of the fourth lens group that is a focusing lens group. If condition (4) is satisfied, reduction of aberration variation and high-speed focusing during zooming can be obtained. If the ratio exceeds the upper limit of condition (4), aberration variations, especially variations in image plane curvature, increase between the infinity focusing state and the close focusing state, leading to degradation of image quality. On the other hand, if the ratio is below the lower limit of condition (4), the amount of focus movement increases, resulting in difficulty in achieving high-speed focusing.

It is also preferable to satisfy condition (5):

$$1.0 < m4T/m4W < 1.3 \tag{5}$$

where
m4T is a magnification of the fourth lens group at the telephoto end, and
m4W is a magnification of the fourth lens group at the wide angle end.

Specific numerical values of magnifications of the fourth lens group at the telephoto end and the wide angle end are shown in Tables 3D, 6D, and 9D of the first through third numerical working examples described later.

Condition (5) is a condition for defining a ratio of a magnification of the fourth lens group at the telephoto end to a magnification of the fourth lens group at the wide angle end. If the ratio is below the lower limit of condition (5), the magnification of the fourth lens group at the telephoto end excessively decreases, resulting in difficulty in correcting various aberrations, especially image plane curvature. On the other hand, if the ratio exceeds the upper limit of condition (5), the magnification of the fourth lens group at the wide angle end excessively decreases, resulting in difficulty in correcting various aberrations, especially image plane curvature.

The first lens group is preferably constituted by two or three lens elements.

In this case, it is possible to achieve both correction of various aberrations, especially chromatic aberration, and reduction of thickness of the first lens group.

Each of the second lens group, the third lens group, the fourth lens group, and the fifth lens group preferably includes a lens element having at least one aspheric surface.

In this case, aberrations can be appropriately corrected so that the number of lens elements can be reduced, resulting in size reduction.

The fourth lens group is preferably constituted by one lens element. In this case, the number of necessary lens elements decreases so that size reduction and cost reduction can also be achieved. In addition, the weight can be reduced so that high-speed focusing can be achieved.

The fifth lens group is preferably constituted by one lens element. In this case, the number of necessary lens elements decreases so that size reduction and cost reduction can also be achieved. In addition, the weight can be reduced so that a lightweight lens barrel can be obtained.

Each of the fourth lens group and the fifth lens group is preferably constituted by one lens element, and condition (6), for example, is preferably satisfied:

$$1.3 < |vd2+vd3|/|vd4+vd5| < 2.0 \tag{6}$$

where
vd2 is an Abbe number of one of the lens elements closest to an object in the second lens group,
vd3 is an Abbe number of one of the lens elements closest to the object in the third lens group,
vd4 is an Abbe number of the lens element of the fourth lens group, and
vd5 is an Abbe number of the lens element of the fifth lens group.

Abbe numbers of the lens elements are shown in Tables 1, 4, and 7 of the first through third numerical working examples described later.

Condition (6) is a condition for defining Abbe numbers of the lens element at the side closest to the object in the second lens group, the lens element closest to the object side in the third lens group, the single lens element of the fourth lens group, and the single lens element of the fifth lens group. If condition (6) is satisfied, it is possible to achieve both correction of chromatic aberration from infinity to a close range in a range from the wide angle end to the telephoto end and provision of a compact lens barrel, a compact imaging apparatus, and a compact camera.

More preferably, the advantages described above can be enhanced by satisfying condition (6)':

$$1.5 < |vd2+vd3|/|vd4+vd5| < 1.8 \tag{6}'$$

Whole or a part of the third lens group preferably moves while having a component perpendicular to the optical axis in image shake correction.

In this case, the lens diameter can be reduced so that the size and weight of the image shake correcting lens group can be reduced. Accordingly, the image shake correcting lens group can be driven by a simple driving mechanism. In particular, in a case where the image shake correcting lens group is constituted only by one lens element, the mechanism for driving the image shake correcting lens group can be further simplified.

The third lens group preferably includes a stop. In this case, the barrel configuration can be simplified so that the size of the lens barrel can be reduced.

(Schematic Configuration of Digital Camera to which First Exemplary Embodiment is Applied)

Figure 10:
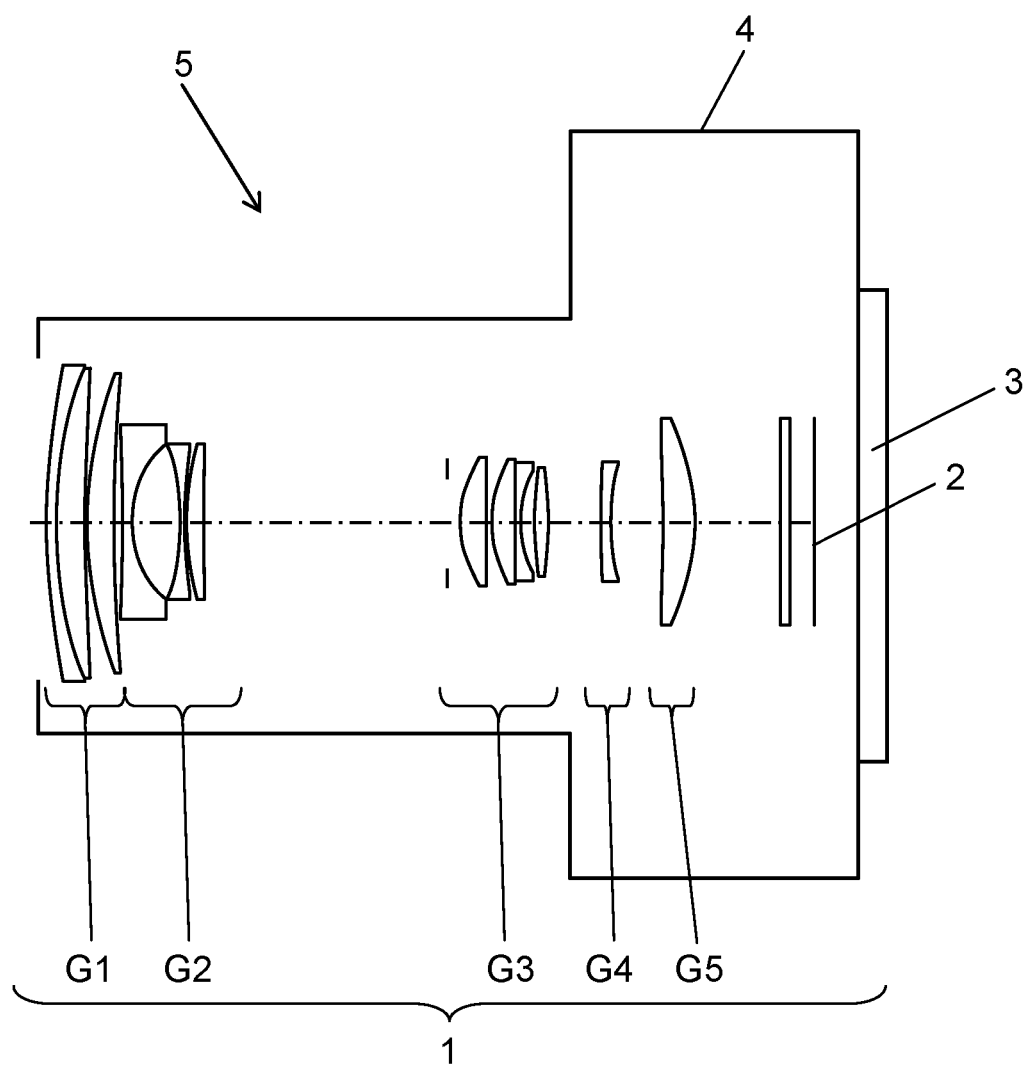
FIG. 10 schematically illustrates a digital still camera to which the zoom lens system according to the first exemplary embodiment is applied.

FIG. 10 schematically illustrates a configuration of a digital camera to which the zoom lens system according to the first exemplary embodiment is applied. Alternatively, the zoom lens system according to the second or third exemplary embodiment may be applied.

Digital camera 5 includes housing 4, imaging element 2, zoom lens system 1, and monitor 3.

In zoom lens system 1, an actuator and a lens frame are disposed so that all the lens groups of first through fifth lens groups G1 through G5 move along an optical axis during zooming, in a manner similar to that in the first exemplary embodiment.

In the above example, the zoom lens system according to the first exemplary embodiment is applied to the digital camera. Alternatively, the zoom lens system may be applied to a smartphone or a camera with interchangeable lenses, for example. Digital camera 5 is an example of an imaging apparatus.

Numerical Working Examples

Numerical working examples as specific examples of the zoom lens systems according to the first through third exemplary embodiments will now be described. In the numerical working examples, all the lengths are indicated in units of "mm" and all the half angles of view are indicated in units of "°" in the tables. In the numerical working examples, r is a radius of curvature, d is a plane distance, nd is a refractive index to a d-line, and vd is an Abbe number with respect to the d-line. In the numerical working examples, a surface provided with * is an aspheric surface, which is defined by the following equation:

$$Z = \frac{h^2/r}{1+\sqrt{1-(1+\kappa)(h/r)^2}} + \sum A_n h^n \qquad \text{[Equation 1]}$$

where
Z is a distance from a point on an aspheric surface at a height of h from the optical axis to a tangent plane of a vertex of the aspheric surface, h is a height from the optical axis,
r is a vertex radius of curvature,
κ is a conic constant, and
An is a coefficient of an n-th order aspheric surface.

Figure 2:
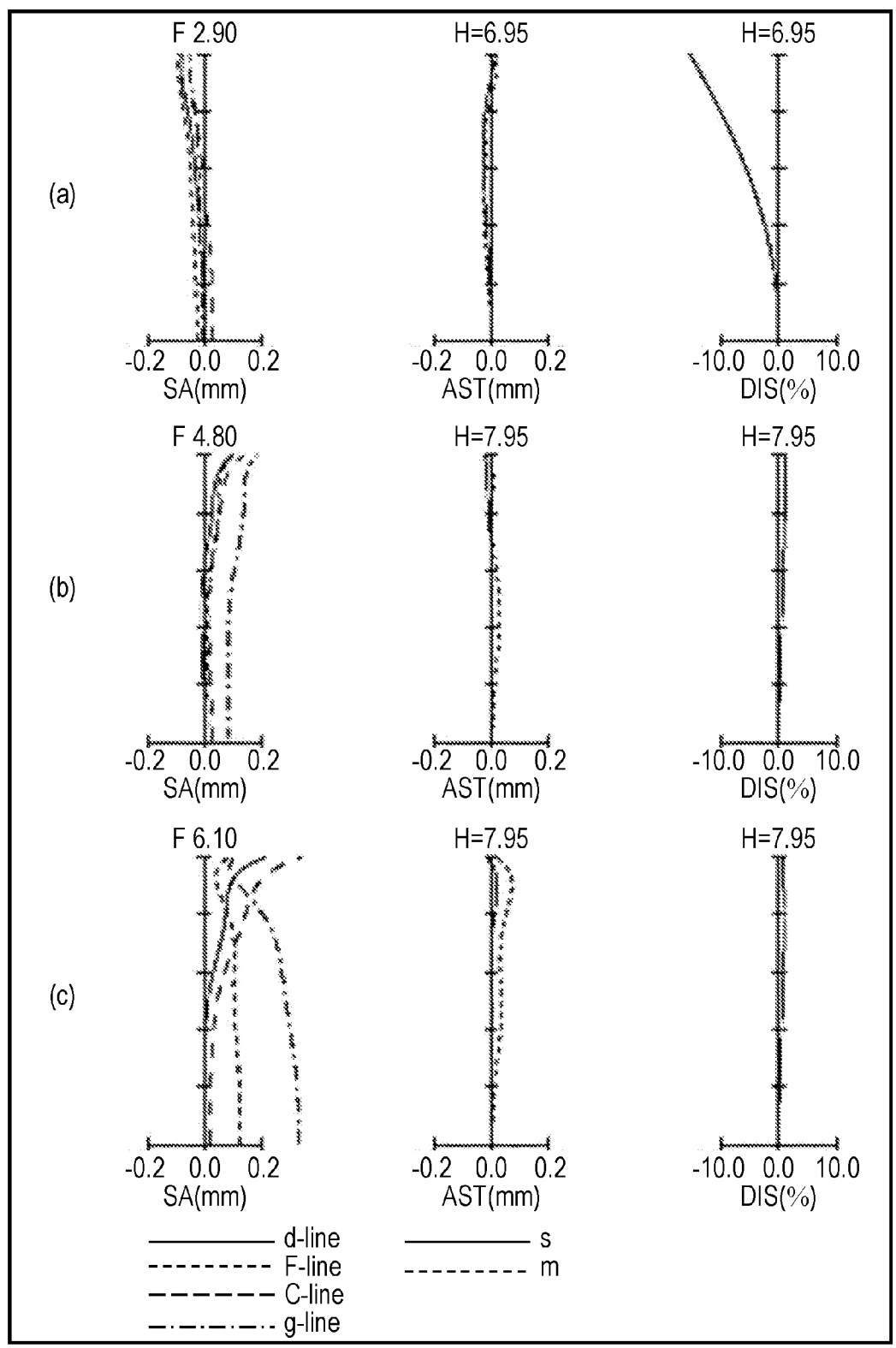
FIG. 2 illustrates a longitudinal aberration in the infinity focusing state of the zoom lens system according to the first working example.
Figure 5:
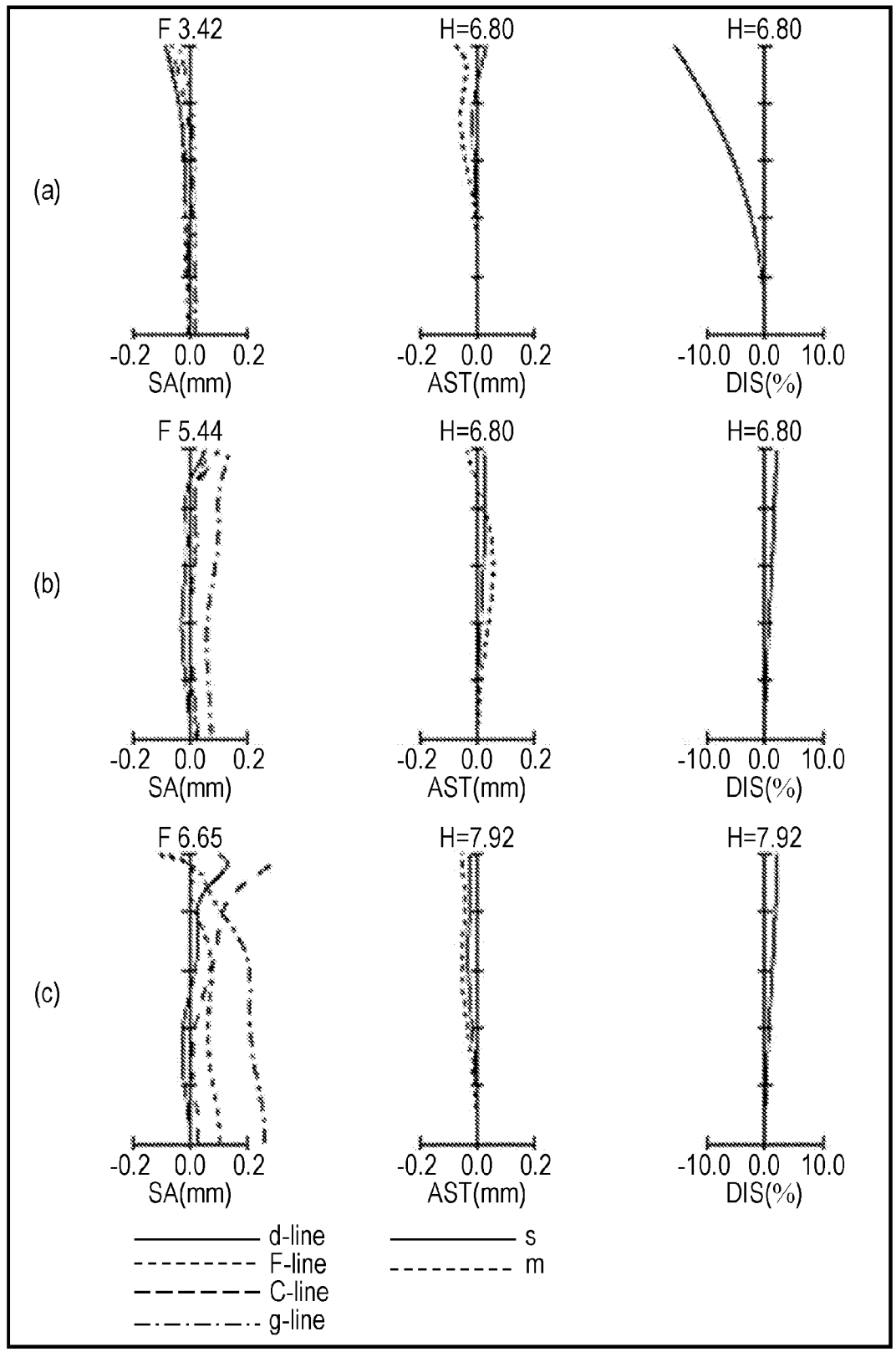
FIG. 5 illustrates a longitudinal aberration in the infinity focusing state of the zoom lens system according to the second working example.
Figure 8:
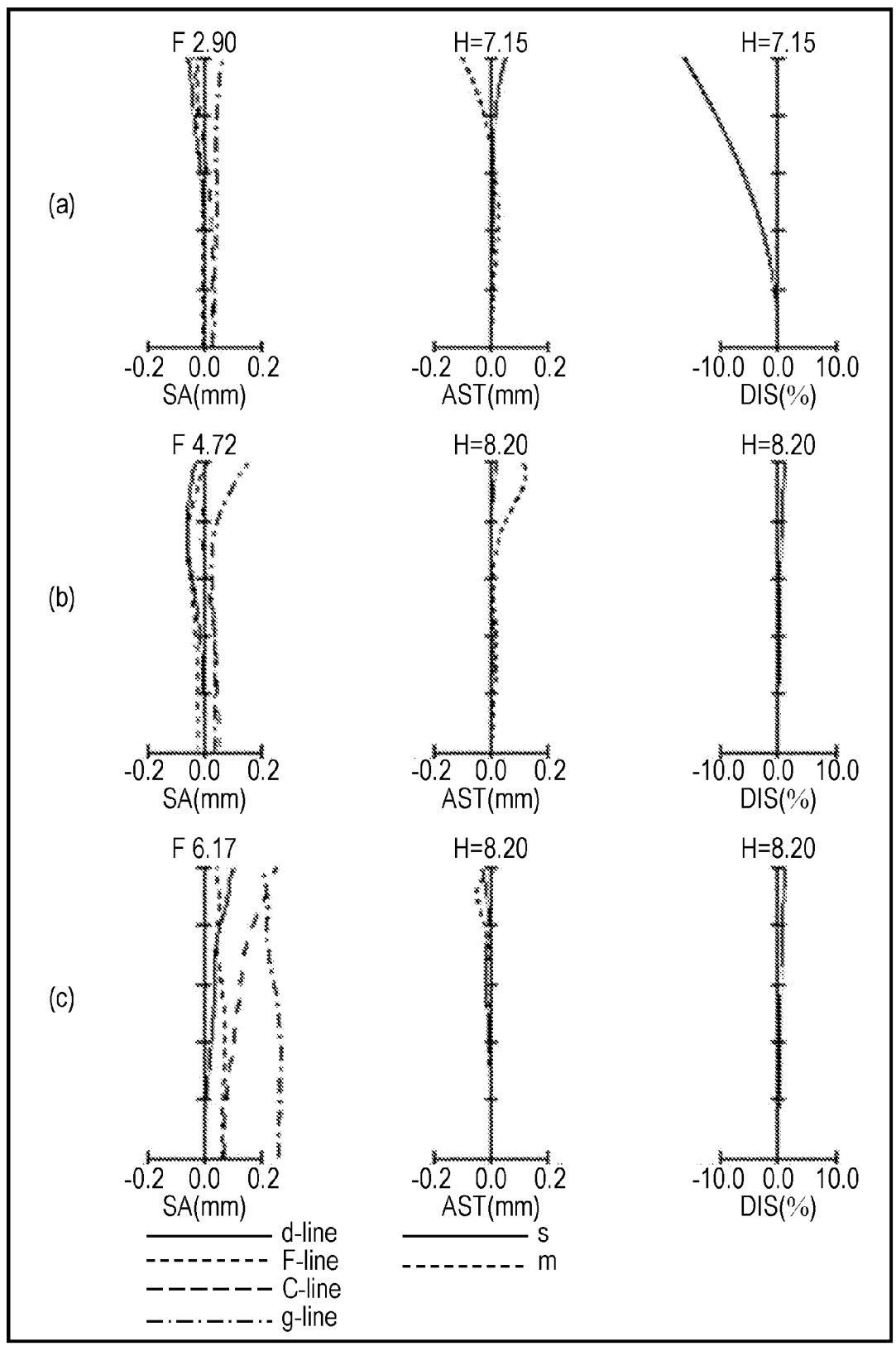
FIG. 8 illustrates a longitudinal aberration in the infinity focusing state of the zoom lens system according to the third working example.

FIGS. 2, 5, and 8 illustrate longitudinal aberrations of infinity focusing states of the zoom lens systems according to the first through third working examples.

In each longitudinal aberration diagram, (a) illustrates an aberration at a wide angle end, (b) illustrates an aberration at an intermediate position, and (c) illustrates an aberration at a telephoto end. In each longitudinal aberration diagram, a spherical aberration (SA (mm)), an astigmatism (AST (mm)), and a distortion (DIS (%)) are arranged in order from the left. In each spherical aberration diagram, the ordinate represents an F number (indicated by F in the diagram), a solid-line represents a characteristic of a d-line, a short dashed line represents a characteristic of an F-line, a long dashed line represents a characteristic of a C-line, and a chain line represents a characteristic of a g-line. In each astigmatism diagram, the ordinate represents an image height (indicated by H in the diagram), a solid line represents a sagittal plane (indicated by s in the diagram), and a broken line represents a characteristic of a meridional plane (indicated by m in the diagram). In each distortion diagram, the ordinate represents an image height (indicated by H in the diagram).

Figure 3:
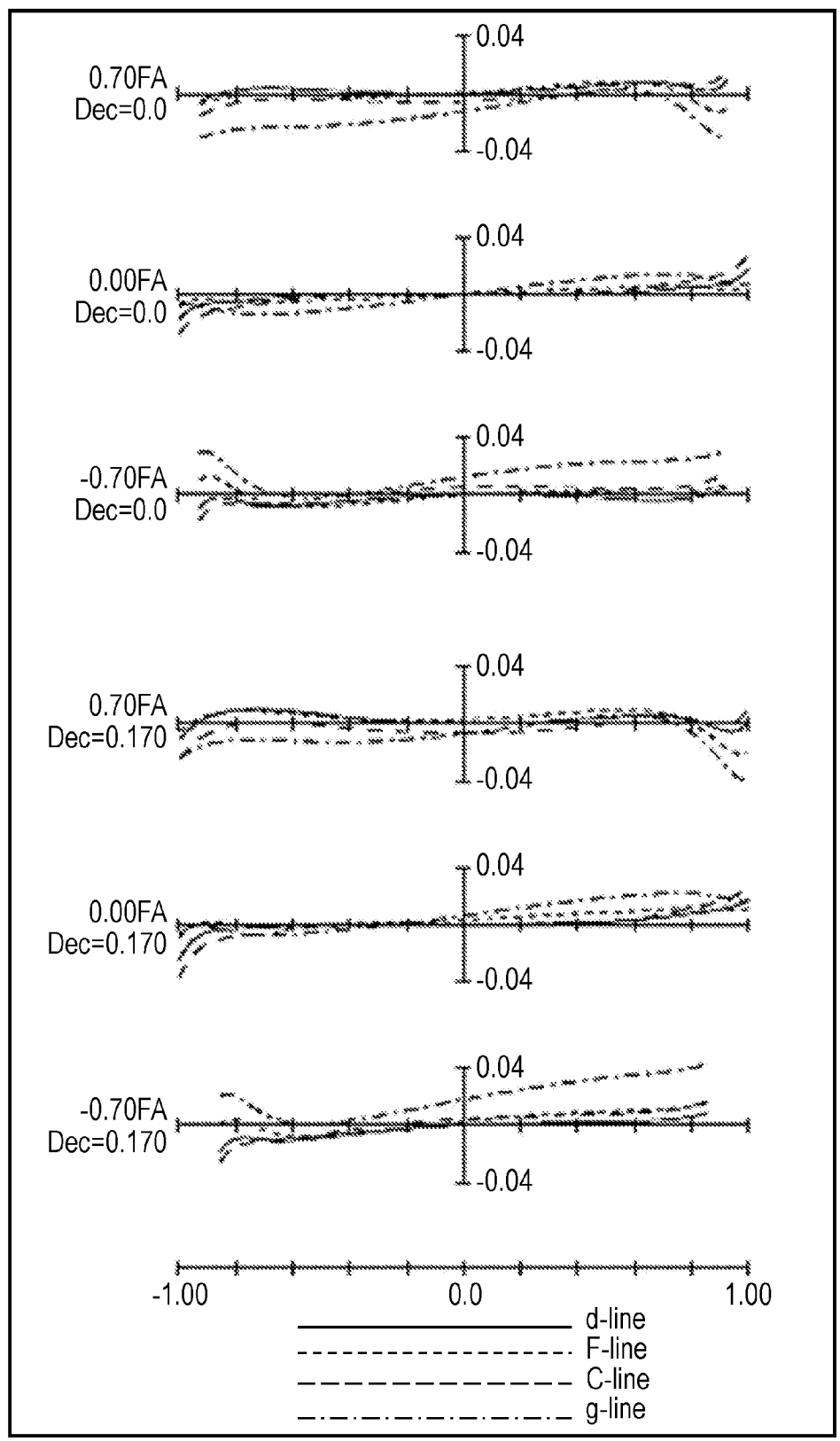
FIG. 3 illustrates a lateral aberration in a basic state without image shake correction and an image shake correction state at a telephoto end of the zoom lens system according to the first working example.
Figure 6:
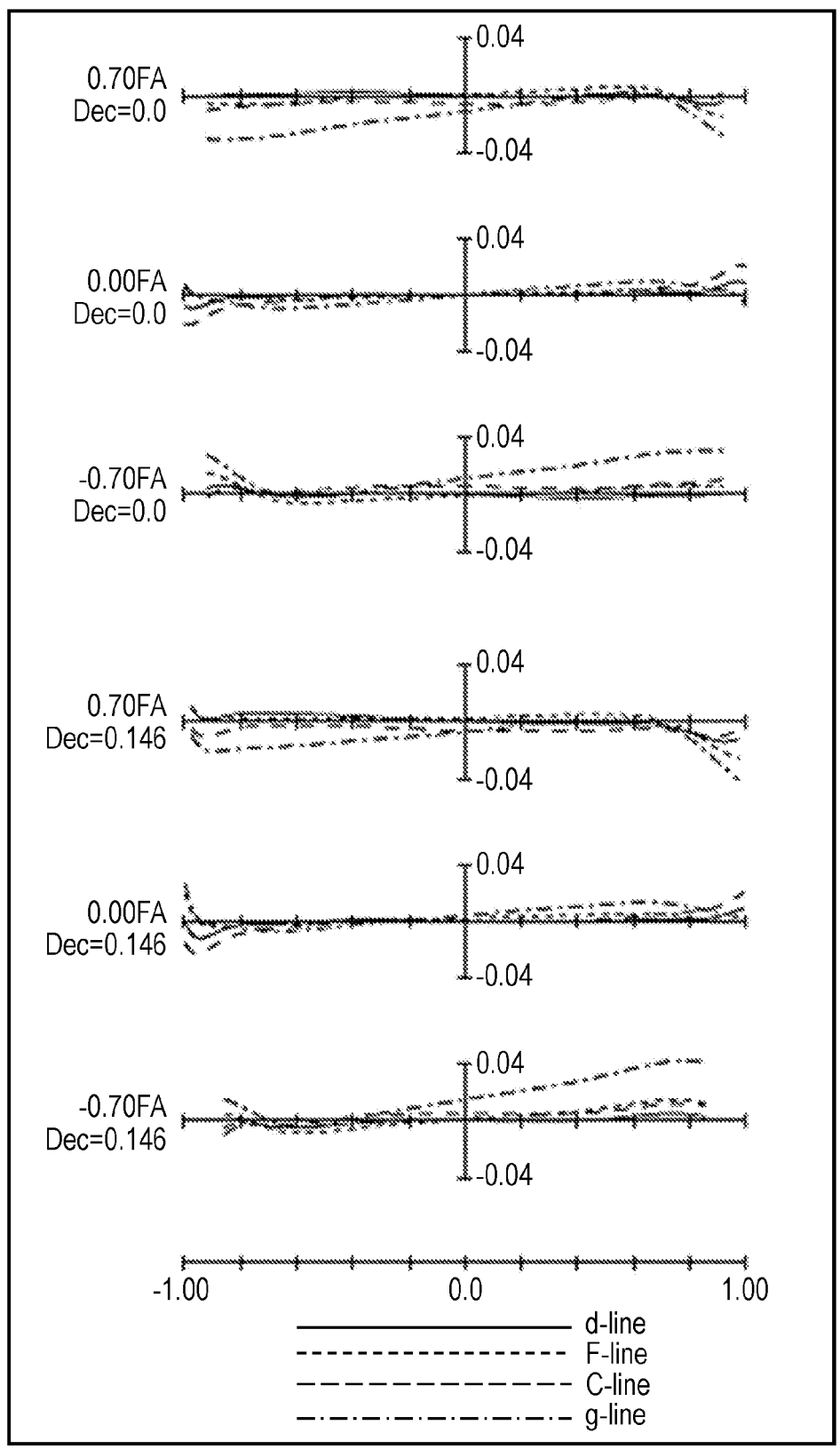
FIG. 6 illustrates a lateral aberration in a basic state without image shake correction and an image shake correction state at a telephoto end of the zoom lens system according to the second working example.
Figure 9:
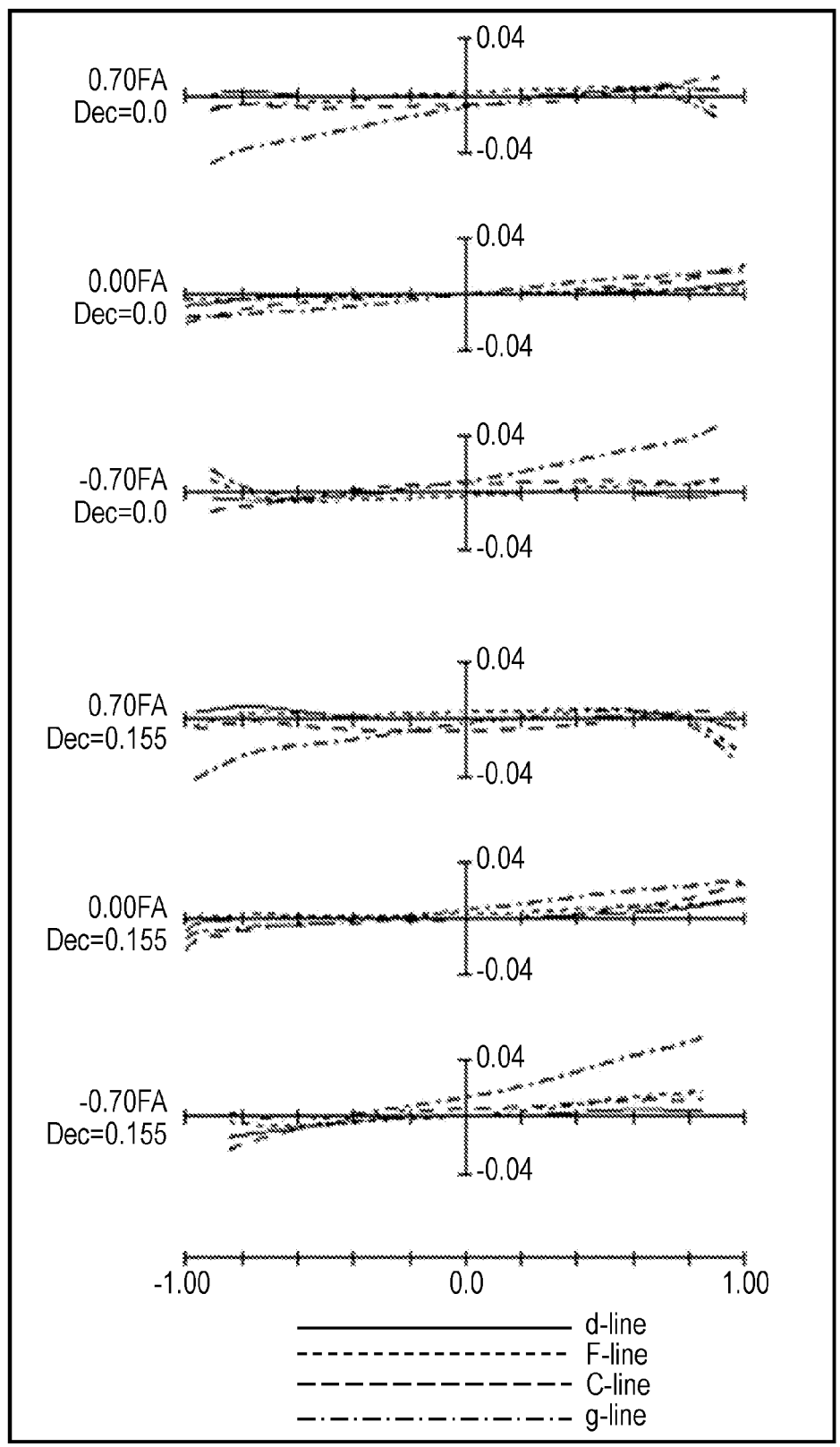
FIG. 9 illustrates a lateral aberration in a basic state without image shake correction and an image shake correction state at a telephoto end of the zoom lens system according to the third working example.

FIGS. 3, 6, and 9 illustrate lateral aberrations at the telephoto ends of the zoom lens systems according to the first through third exemplary embodiments.

In each lateral aberration diagram, the upper three aberration diagrams correspond to a basic state in which no image shake correction at the telephoto end is performed, and the lower three aberration diagrams correspond to an image shake correction state in which an image shake correcting lens element or an image shake correcting lens group moves perpendicularly to the optical axis at the telephoto end. In each lateral aberration diagram corresponding to the basic state, the upper stage corresponds to a lateral aberration in an image point of 70% of the maximum image height, the intermediate stage corresponds to a lateral aberration in an on-axis image point, and the lower stage corresponds to a lateral aberration in an image point of −70% of the maximum image height. In each lateral aberration diagram corresponding to the image shake correction state, the upper stage corresponds to a lateral aberration in an image point of 70% of the maximum image height, the intermediate stage corresponds to a lateral aberration in an on-axis image point, and the lower stage corresponds to a lateral aberration in an image point of −70% of the maximum image height. In each lateral aberration diagram, the abscissa represents a distance from a principal ray on a pupil plane, a solid line represents a characteristic of a d-line, a short dashed line represents a characteristic of an F-line, a long dashed line represents a characteristic of a C-line, and a chain line represents a characteristic of a g-line. In each lateral aberration diagram, a meridional plane is a plane including the optical axis of first lens group G1 and the optical axis of third lens group G3 (first through third working examples).

In the zoom lens system according to each working example, the amount of movement of the image shake correcting lens group in the direction perpendicular to the optical axis in the image shake correction state at the telephoto end is as follows:
first working example: 0.170 mm
second working example: 0.146 mm
third working example: 0.155 mm The amount of image eccentricity in a case where a capturing distance is ∞ and the zoom lens system is tilted by a predetermined angle at the telephoto end is equal to the amount of image eccentricity in a case where the image shake correcting lens group moves to each distance described above in parallel in a direction perpendicular to the optical axis.

As clearly shown in the lateral aberration diagrams, a lateral aberration in the on-axis image point shows excellent symmetry. When a lateral aberration in the +70% image point and a lateral aberration in the −70% image point are compared in the basic state, both of the lateral aberrations show small degrees of curvature and substantially the same tilts of aberration curves so that decentering coma and decentering astigmatism are small. This means that sufficient imaging performance can be obtained even in the image shake correction state. In a case where the zoom lens systems have the same image shake correction angle, as the focal length of the entire zoom lens system decreases, the amount of parallel movement necessary for image shake correction decreases. Thus, at any zoom position, sufficient image shake correction can be performed on image correction angles to a predetermined angle without degradation of imaging characteristic.

First Numerical Working Example

The zoom lens system according to the first numerical working example corresponds to that of the first exemplary embodiment illustrated in FIG. 1. With respect to the zoom lens system of the first numerical working example, Table 1 shows surface data, Table 2 shows aspheric surface data, and Tables 3A through 3D show data in an infinity focusing state.

(Surface Data)

TABLE 1

| Surface number | r | d | nd | vd |
|---|---|---|---|---|
| Object surface | ∞ | | | |
| 1 | 59.05750 | 0.75000 | 1.92286 | 20.9 |
| 2 | 38.31680 | 0.00500 | 1.56732 | 42.8 |
| 3 | 38.31680 | 2.46130 | 1.59282 | 68.6 |
| 4 | 171.93690 | 0.15000 | | |
| 5 | 36.56980 | 2.29950 | 1.69680 | 55.5 |
| 6 | 128.83730 | variable | | |
| 7* | 128.85870 | 0.70000 | 1.80748 | 40.8 |
| 8* | 9.04210 | 4.35240 | | |
| 9 | −18.47870 | 0.50000 | 1.74330 | 49.2 |
| 10 | 89.02820 | 0.15000 | | |
| 11 | 25.94110 | 1.53320 | 1.94595 | 18.0 |
| 12 | −261.52270 | variable | | |
| 13(Aperture) | ∞ | 1.00000 | | |
| 14* | 11.68540 | 1.87200 | 1.80748 | 40.8 |
| 15* | 59.58060 | 0.47730 | | |
| 16 | 9.33460 | 2.07700 | 1.49700 | 81.6 |
| 17 | 100.38000 | 0.00500 | 1.56732 | 42.8 |
| 18 | 100.38000 | 0.50020 | 1.80518 | 25.5 |
| 19 | 9.25450 | 1.30820 | | |
| 20 | 27.35950 | 1.24320 | 1.58575 | 59.5 |
| 21* | −34.63140 | variable | | |
| 22* | 194.35720 | 0.60000 | 1.80545 | 40.9 |
| 23* | 21.92190 | variable | | |
| 24* | 1120.26840 | 3.05450 | 1.53380 | 55.6 |
| 25* | −18.31520 | variable | | |
| 26 | ∞ | 0.90000 | 1.51680 | 64.2 |
| 27 | ∞ | BF | | |
| Image surface | ∞ | | | |

(Aspheric Surface Data)

TABLE 2

Surface No. 7

K = 0.00000E+00, A4 = −1.25804E−04, A6 = 2.82238E−06,
A8 = −2.81354E−08, A10 = 1.06612E−10, A12 = 0.00000E+00
Surface No. 8

K = −5.46578E−01, A4 = −5.63319E−05, A6 = 2.25147E−06,
A8 = 3.15569E−08, A10 = −2.55976E−10, A12 = 0.00000E+00
Surface No. 14

K = 0.00000E+00, A4 = 4.28071E−05, A6 = −1.71460E−06,
A8 = 5.32445E−08, A10 = −3.89528E−10, A12 = −7.90670E−11
Surface No. 15

K = 0.00000E+00, A4 = 7.40739E−05, A6 = −3.69028E−06,
A8 = 1.41914E−07, A10 = −5.21020E−09, A12 = −6.94641E−12
Surface No. 21

K = 0.00000E+00, A4 = 2.19811E−04, A6 = 6.26671E−06,
A8 = −8.58453E−08, A10 = 6.49432E−09, A12 = 0.00000E+00
Surface No. 22

K = 0.00000E+00, A4 = 1.52958E−04, A6 = 9.10146E−06,
A8 = −4.35054E−07, A10 = 5.54444E−09, A12 = 0.00000E+00
Surface No. 23

K = 0.00000E+00, A4 = 2.05639E−04, A6 = 9.73730E−06,
A8 = −4.22024E−07, A10 = 4.83065E−09, A12 = 0.00000E+00
Surface No. 24

K = 0.00000E+00, A4 = −5.18519E−05, A6 = 3.42646E−07,
A8 = 5.81837E−09, A10 = 1.99132E−11, A12 = 0.00000E+00
Surface No. 25

K = 0.00000E+00, A4 = −1.14850E−05, A6 = −3.80950E−07,
A8 = 7.85323E−09, A10 = 3.85709E−11, A12 = 0.00000E+00

(Data in Infinity Focusing State)

TABLE 3A

| | Wide angle end | Intermediate position | Telephoto end |
|---|---|---|---|
| Focal length | 9.5097 | 28.0168 | 87.3078 |
| Zoom ratio | 1 | 2.94613 | 9.18092 |
| F-number | 2.90471 | 4.80173 | 6.10408 |
| Half view angel | 40.8826 | 15.6929 | 5.1704 |
| Image height | 6.9500 | 7.9500 | 7.9500 |
| Optical total length | 65.3506 | 77.1340 | 92.3452 |
| BF | 2.06573 | 1.95884 | 1.91832 |
| d6 | 0.5015 | 11.5963 | 29.2345 |
| d12 | 20.7675 | 8.3323 | 1.0000 |
| d21 | 4.7784 | 8.5798 | 12.3147 |
| d23 | 4.1728 | 14.9487 | 19.9389 |
| d25 | 7.1259 | 5.7793 | 2.0000 |

TABLE 3B

Single Lens Data

| Lens elements | Start surface | Focal length |
|---|---|---|
| L1 | 1 | −120.3119 |
| L2 | 3 | 82.6026 |
| L3 | 5 | 72.5410 |
| L4 | 7 | −12.0745 |
| L5 | 9 | −20.5465 |
| L6 | 11 | 25.0136 |
| L7 | 14 | 17.6932 |
| L8 | 16 | 20.5520 |
| L9 | 18 | −12.6920 |
| L10 | 20 | 26.2886 |

TABLE 3B-continued

Single Lens Data

| Lens elements | Start surface | Focal length |
|---|---|---|
| L11 | 22 | −30.7249 |
| L12 | 24 | 33.7905 |

TABLE 3C

Zoom Lens Groups Data

| Lens groups | Start surface | Focal length | Lens configuration length | Front principal point position | Rear principal point position |
|---|---|---|---|---|---|
| G1 | 1 | 57.98361 | 5.66580 | 0.66220 | 2.88635 |
| G2 | 7 | −10.87831 | 7.23560 | 0.58926 | 1.83434 |
| G3 | 13 | 14.59572 | 8.48290 | 1.00214 | 2.99487 |
| G4 | 22 | −30.72489 | 0.60000 | 0.37516 | 0.64231 |
| G5 | 24 | 33.79048 | 3.05450 | 1.96125 | 3.02244 |

TABLE 3D

Zoom Lens Groups Magnification

| Lens groups | Start surface | Wide angle end | Intermediate position | Telephoto end |
|---|---|---|---|---|
| G1 | 1 | 0.00000 | 0.00000 | 0.00000 |
| G2 | 7 | −0.25161 | −0.33846 | −0.75012 |
| G3 | 13 | −0.55729 | −0.99289 | −1.23212 |
| G4 | 22 | 1.64862 | 1.91073 | 1.88226 |
| G5 | 24 | 0.70947 | 0.75249 | 0.86553 |

Second Numerical Working Example

The zoom lens system according to the second numerical working example corresponds to that of the second exemplary embodiment illustrated in FIG. 4. With respect to the zoom lens system of the second numerical working example, Table 4 shows surface data, Table 5 shows aspheric surface data, and Tables 6A through 6D show data in an infinity focusing state.

(Surface Data)

TABLE 4

| Surface number | r | d | nd | vd |
|---|---|---|---|---|
| Object surface | ∞ | | | |
| 1 | 27.35360 | 0.70000 | 1.92286 | 20.9 |
| 2 | 21.20150 | 0.00500 | 1.56732 | 42.8 |
| 3 | 21.20150 | 4.27560 | 1.58575 | 59.5 |
| 4* | −309.06020 | variable | | |
| 5* | 1313.46570 | 0.70000 | 1.80755 | 40.9 |
| 6* | 9.07760 | 3.69300 | | |
| 7 | −15.66140 | 0.50000 | 1.83481 | 42.7 |
| 8 | 70.44910 | 0.15000 | | |
| 9 | 26.76460 | 1.39270 | 1.94595 | 18.0 |
| 10 | −63.56280 | variable | | |
| 11 Aperture) | ∞ | 1.00000 | | |
| 12* | 9.77820 | 2.32360 | 1.58575 | 59.5 |
| 13* | −423.05200 | 0.15000 | | |
| 14 | 8.47840 | 1.78800 | 1.49700 | 81.6 |
| 15 | 25.45170 | 0.00500 | 1.56732 | 42.8 |
| 16 | 25.45170 | 0.50000 | 1.80518 | 25.5 |
| 17 | 8.50670 | 1.42440 | | |
| 18 | 44.04270 | 1.01940 | 1.54410 | 55.6 |
| 19* | −27.85640 | variable | | |
| 20* | −169.14460 | 0.55000 | 1.54410 | 55.6 |

TABLE 4-continued

| Surface number | r | d | nd | vd |
|---|---|---|---|---|
| 21* | 18.67240 | variable | | |
| 22* | 490.35510 | 2.81870 | 1.51443 | 63.3 |
| 23* | −20.17640 | variable | | |
| 24 | ∞ | 0.90000 | 1.51680 | 64.2 |
| 25 | ∞ | BF | | |
| Image surface | ∞ | | | |

(Aspheric Surface Data)

TABLE 5

Surface No. 4

K = 0.00000E+00, A4 = 2.50850E−06, A6 = −2.96109E−09,
A8 = 3.23672E−11, A10 = −1.45128E−13
Surface No. 5

K = 0.00000E+00, A4 = −4.02800E−05, A6 = 8.34074E−07,
A8 = −2.64244E−09, A10 = −2.87833E−11
Surface No. 6

K = −1.01889E−01, A4 = −2.63918E−05, A6 = 7.97351E−07,
A8 = 3.47456E−09, A10 = 9.03373E−10
Surface No. 12

K = 0.00000E+00, A4 = 5.03644E−05, A6 = −2.50380E−06,
A8 = 1.58315E−07, A10 = −6.80467E−09
Surface No. 13

K = 0.00000E+00, A4 = 1.67039E−04, A6 = −4.25903E−06,
A8 = 9.26796E−08, A10 = −6.34494E−09
Surface No. 19

K = 0.00000E+00, A4 = 2.53855E−04, A6 = 9.92826E−06,
A8 = 3.56871E−08, A10 = 8.77237E−09
Surface No. 20

K = 0.00000E+00, A4 = 1.10249E−04, A6 = 1.43014E−05,
A8 = −1.88663E−07, A10 = −1.30322E−08
Surface No. 21

K = 0.00000E+00, A4 = 1.66305E−04, A6 = 1.29294E−05,
A8 = −1.23391E−07, A10 = −1.29408E−08
Surface No. 22

K = 0.00000E+00, A4 = 6.40191E−05, A6 = −1.21301E−06,
A8 = 3.60835E−09, A10 = 1.20791E−10
Surface No. 23

K = 0.00000E+00, A4 = 1.32118E−04, A6 = −1.83589E−06,
A8 = 1.55435E−10, A10 = 1.72559E−10

(Data in Infinity Focusing State)

TABLE 6A

| | Wide angle end | Intermediate position | Telephoto end |
|---|---|---|---|
| Focal length | 9.4983 | 28.6903 | 87.8039 |
| Zoom ratio | 1 | 3.02057 | 9.24417 |
| F-number | 3.42136 | 5.44159 | 6.64748 |
| Half view angel | 40.3572 | 13.0953 | 5.0525 |
| Image height | 6.7980 | 6.7980 | 7.9180 |
| Optical total length | 59.3614 | 69.8187 | 87.9638 |
| BF | 2.04179 | 1.98623 | 1.96401 |
| d4 | 0.5000 | 5.8582 | 23.6873 |
| d10 | 17.6258 | 6.0853 | 1.0000 |
| d19 | 3.6167 | 9.2648 | 10.7131 |
| d21 | 2.9824 | 16.6444 | 24.7040 |
| d23 | 8.6993 | 6.0844 | 2.0000 |

TABLE 6B

Single Lens Data

| Lens elements | Start surface | Focal length |
|---|---|---|
| L1 | 1 | −108.0464 |
| L2 | 3 | 34.0346 |
| L3 | 5 | −11.3219 |
| L4 | 7 | −15.3079 |
| L5 | 9 | 20.0607 |
| L6 | 12 | 16.3488 |
| L7 | 14 | 24.7162 |
| L8 | 16 | −16.0804 |
| L9 | 18 | 31.5190 |
| L10 | 20 | −30.8743 |
| L11 | 22 | 37.7416 |

TABLE 6C

Zoom Lens Groups Data

| Lens groups | Start surface | Focal length | Lens configuration length | Front principal point position | Rear principal point position |
|---|---|---|---|---|---|
| G1 | 1 | 50.47233 | 4.98060 | 0.00253 | 1.90386 |
| G2 | 5 | −9.63438 | 6.43570 | 0.59748 | 1.75659 |
| G3 | 11 | 13.48306 | 8.21040 | 1.15103 | 3.00792 |
| G4 | 20 | −30.87427 | 0.55000 | 0.32045 | 0.51462 |
| G5 | 22 | 37.74164 | 2.81870 | 1.79103 | 2.74501 |

TABLE 6D

Zoom Lens Groups Magnification

| Lens groups | Start surface | Wide angle end | Intermediate position | Telephoto end |
|---|---|---|---|---|
| G1 | 1 | 0.00000 | 0.00000 | 0.00000 |
| G2 | 5 | −0.26278 | −0.30775 | −0.71491 |
| G3 | 11 | −0.60902 | −1.22220 | −1.36618 |
| G4 | 20 | 1.68533 | 1.96653 | 2.03028 |
| G5 | 22 | 0.69773 | 0.76849 | 0.87730 |

Third Numerical Working Example

The zoom lens system according to the third numerical working example corresponds to that of the third exemplary embodiment illustrated in FIG. 7. With respect to the zoom lens system of the third numerical working example, Table 7 shows surface data, Table 8 shows aspheric surface data, and Tables 9A through 9D show data in an infinity focusing state.

(Surface Data)

TABLE 7

| Surface number | r | d | nd | vd |
|---|---|---|---|---|
| Object surface | ∞ | | | |
| 1 | 30.38470 | 0.75000 | 1.92286 | 20.9 |
| 2 | 23.25910 | 0.01000 | 1.56732 | 42.8 |
| 3 | 23.25910 | 4.40320 | 1.58575 | 59.5 |
| 4* | −440.01560 | variable | | |
| 5* | 500.00000 | 0.70000 | 1.80755 | 40.9 |
| 6* | 9.38720 | 4.51440 | | |
| 7 | −19.48260 | 0.50000 | 1.72916 | 54.7 |
| 8 | 83.84340 | 0.15000 | | |
| 9 | 25.81650 | 1.38440 | 1.94595 | 18.0 |
| 10 | −662.51360 | variable | | |
| 11 (Aperture) | ∞ | 1.00000 | | |

TABLE 7-continued

| Surface number | r | d | nd | νd |
|---|---|---|---|---|
| 12* | 10.52030 | 2.24210 | 1.80755 | 40.9 |
| 13* | 214.37460 | 0.20010 | | |
| 14 | 10.29100 | 1.81820 | 1.49700 | 81.6 |
| 15 | 41.07390 | 0.01000 | 1.56732 | 42.8 |
| 16 | 41.07390 | 0.50000 | 1.80518 | 25.5 |
| 17 | 7.25980 | 1.50970 | | |
| 18 | 27.92670 | 1.66110 | 1.48749 | 70.4 |
| 19 | −19.85680 | variable | | |
| 20* | 91.25280 | 0.55000 | 1.80755 | 40.9 |
| 21* | 18.97760 | variable | | |
| 22* | 184.48640 | 3.38930 | 1.53380 | 55.6 |
| 23* | −19.45710 | variable | | |
| 24 | ∞ | 0.90000 | 1.51680 | 64.2 |
| 25 | ∞ | BF | | |
| Image surface | ∞ | | | |

(Aspheric Surface Data)

TABLE 8

Surface No. 4

K = 0.00000E+00, A4 = 1.51523E−06, A6 = 1.50964E−09,
A8 = −1.29873E−11, A10 = 2.76658E−14, A12 = 0.00000E+00

Surface No. 5

K = 0.00000E+00, A4 = −3.53666E−05, A6 = 5.68006E−07,
A8 = −3.57814E−09, A10 = 6.28382E−12, A12 = 0.00000E+00

Surface No. 6

K = −4.58008E−01, A4 = 2.00404E−05, A6 = 6.98882E−07,
A8 = 1.94959E−09, A10 = 1.79084E−10, A12 = 0.00000E+00

Surface No. 12

K = 0.00000E+00, A4 = −3.50717E−05, A6 = −1.12679E−07,
A8 = 6.64006E−08, A10 = −3.33344E−09, A12 = 6.00482E−11

Surface No. 13

K = 0.00000E+00, A4 = 7.23263E−05, A6 = −3.43532E−08,
A8 = 7.84070E−08, A10 = −4.12426E−09, A12 = 7.74508E−11

Surface No. 20

K = 0.00000E+00, A4 = 1.03940E−04, A6 = −2.26979E−06,
A8 = −1.27963E−08, A10 = −6.72859E−10, A12 = 0.00000E+00

Surface No. 21

K = 0.00000E+00, A4 = 1.63004E−04, A6 = −2.36966E−06,
A8 = −4.56247E−08, A10 = −8.92935E−11, A12 = 0.00000E+00

Surface No. 22

K = 0.00000E+00, A4 = −8.29394E−06, A6 = 3.07234E−07,
A8 = 4.54318E−09, A10 = −4.30909E−11, A12 = 0.00000E+00

Surface No. 23

K = 0.00000E+00, A4 = −2.81224E−06, A6 = −1.43064E−07,
A8 = 1.20518E−08, A10 = −7.72138E−11, A12 = 0.00000E+00

(Data in Infinity Focusing State)

TABLE 9A

| | Wide angle end | Intermediate position | Telephoto end |
|---|---|---|---|
| Focal length | 9.5013 | 28.6531 | 87.8077 |
| Zoom ratio | 1 | 3.01570 | 9.24165 |
| F-number | 2.89957 | 4.71840 | 6.17431 |
| Half view angel | 41.9975 | 15.8108 | 5.2783 |
| Image height | 7.1500 | 8.2000 | 8.2000 |
| Optical total length | 66.6118 | 74.8074 | 92.5265 |
| BF | 1.34319 | 1.35527 | 1.25013 |
| d4 | 0.5000 | 8.1372 | 27.1585 |
| d10 | 21.1442 | 6.6667 | 1.0000 |
| d19 | 2.1062 | 9.7580 | 13.6860 |
| d21 | 4.9210 | 13.8176 | 20.7059 |
| d23 | 10.4047 | 8.8801 | 2.5335 |

TABLE 9B

Single Lens Data

| Lens elements | Start surface | Focal length |
|---|---|---|
| L1 | 1 | −113.1887 |
| L2 | 3 | 37.8475 |
| L3 | 5 | −11.8543 |
| L4 | 7 | −21.6370 |
| L5 | 9 | 26.2939 |
| L6 | 12 | 13.6327 |
| L7 | 14 | 27.0973 |
| L8 | 16 | −11.0249 |
| L9 | 18 | 24.0803 |
| L10 | 20 | −29.7720 |
| L11 | 22 | 33.1644 |

TABLE 9C

Zoom Lens Groups Data

| Lens groups | Start surface | Focal length | Lens configuration length | Front principal point position | Rear principal point position |
|---|---|---|---|---|---|
| G1 | 1 | 57.78196 | 5.16320 | −0.08107 | 1.89783 |
| G2 | 5 | −10.70956 | 7.24880 | 0.59216 | 1.78965 |
| G3 | 11 | 14.58885 | 8.94120 | 0.97607 | 2.95061 |
| G4 | 20 | −29.77198 | 0.55000 | 0.38549 | 0.63017 |
| G5 | 22 | 33.16435 | 3.38930 | 2.01055 | 3.17725 |

TABLE 9D

Zoom Lens Groups Magnification

| Lens groups | Start surface | Wide angle end | Intermediate position | Telephoto end |
|---|---|---|---|---|
| G1 | 1 | 0.00000 | 0.00000 | 0.00000 |
| G2 | 5 | −0.25072 | −0.30531 | −0.66700 |
| G3 | 11 | −0.55292 | −1.16782 | −1.36355 |
| G4 | 20 | 1.90858 | 2.08487 | 1.93921 |
| G5 | 22 | 0.62148 | 0.66709 | 0.86163 |

(Corresponding Values of Conditions)

Table 10 below shows corresponding values in conditions in the zoom lens systems according to the numerical working examples.

TABLE 10

| | Example 1 | Example 2 | Example 3 |
|---|---|---|---|
| Condition (1) | 3.17 | 2.83 | 3.00 |
| Condition (2) | 1.07 | 1.00 | 1.06 |
| Condition (3) | 9.18 | 9.24 | 9.24 |
| Condition (4) | −2.84 | −2.84 | −2.95 |
| Condition (5) | 1.14 | 1.20 | 1.02 |
| Condition (6) | 1.73 | 1.57 | 1.74 |

INDUSTRIAL APPLICABILITY

A zoom lens system according to the present disclosure is applicable to a digital still camera, a digital camera with interchangeable lenses, a digital video camera, a camera for a cellular phone, a camera for a personal digital assistance (PDA), a monitoring camera for a monitoring system, a web camera, and a vehicle-mounted camera, for example, and is suitable especially for an capturing optical system that is required of providing high image quality, such as a digital still camera system or a digital video camera system.

What is claimed is:

1. A zoom lens system, in order from an object side to an image side, comprising:
    a first lens group having positive optical power;
    a second lens group having negative optical power;
    a third lens group having positive optical power;
    a fourth lens group having negative optical power; and
    a fifth lens group having positive optical power, wherein
    each of the lens groups moves during zooming from a wide angle end to a telephoto end,
    focusing is performed by moving the fourth lens group on an optical axis, and
    conditions (1) through (3) are satisfied:

$$\Sigma d/fT \times \tan \omega T < 3.5 \qquad (1)$$

$$LT/fT < 1.1 \qquad (2)$$

$$9.1 < fT/fW \qquad (3)$$

where
$\Sigma d$ is a total thickness of each of the lens groups on the optical axis,
$\omega T$ is a half angle of view at the telephoto end,
fW is a focal length at the wide angle end,
fT is a focal length at the telephoto end, and
LT is an optical total length at the telephoto end.

2. The zoom lens system of claim 1, wherein condition (4) is satisfied:

$$-3.0 < fT/fG4 < -2.7 \qquad (4)$$

where
fT is a focal length at the telephoto end, and
fG4 is a focal length of the fourth lens group.

3. The zoom lens system of claim 1, wherein condition (5) is satisfied:

$$1.0 < m4T/m4W < 1.3 \qquad (5)$$

where
m4T is a magnification of the fourth lens group at the telephoto end, and
m4W is a magnification of the fourth lens group at the wide angle end.

4. The zoom lens system of claim 1, wherein
the first lens group is constituted by two or three lens elements.

5. The zoom lens system of claim 1, wherein
each of the second lens group, the third lens group, the fourth lens group, and the fifth lens group includes a lens element having at least one aspheric surface.

6. The zoom lens system of claim 1, wherein
the fourth lens group is constituted by one lens element.

7. The zoom lens system of claim 1, wherein
the fifth lens group is constituted by one lens element.

8. The zoom lens system of claim 1, wherein
each of the fourth lens group and the fifth lens group is constituted by one lens element, and
condition (6) is satisfied:

$$1.3 < |vd2+vd3|/|vd4+vd5| < 2.0 \qquad (6)$$

where
vd2 is an Abbe number of one of the lens elements closest to an object in the second lens group,
vd3 is an Abbe number of one of the lens elements closest to the object in the third lens group,
vd4 is an Abbe number of the fourth lens group, and
vd5 is an Abbe number of the fifth lens group.

9. The zoom lens system of claim 1, wherein
whole or a part of the third lens group moves while having a component perpendicular to the optical axis in image shake correction.

10. The zoom lens system of claim 1, wherein
the third lens group includes a aperture stop.

11. An imaging apparatus comprising:
    a zoom lens system that forms an optical image of an object; and
    an imaging element that converts the optical image formed by the zoom lens system to an electrical image signal, wherein
    the zoom lens system, in order from an object side to an image side, includes
        a first lens group having positive optical power;
        a second lens group having negative optical power;
        a third lens group having positive optical power;
        a fourth lens group having negative optical power; and
        a fifth lens group having positive optical power,
    each of the lens groups moves during zooming from a wide angle end to a telephoto end,
    focusing is performed by moving the fourth lens group on an optical axis, and
    conditions (1) through (3) are satisfied:

$$\Sigma d/fT \times \tan \omega T < 3.5 \qquad (1)$$

$$LT/fT < 1.1 \qquad (2)$$

$$9.1 < fT/fW \qquad (3)$$

where
$\Sigma d$ is a total thickness of each of the lens groups on the optical axis,
$\omega T$ is a half angle of view at the telephoto end,
fW is a focal length at the wide angle end,
fT is a focal length at the telephoto end, and
LT is an optical total length at the telephoto end.

* * * * *